United States Patent Office 3,057,922
Patented Oct. 9, 1962

3,057,922
PREPARATION OF AMINO SUBSTITUTED AROMATIC COMPOUNDS
John P. Luvisi, Park Ridge, and Louis Schmerling, Riverside, Ill., assignors to Universal Oil Products Company, Des Plaines, Ill., a corporation of Delaware
No Drawing. Filed Oct. 23, 1959, Ser. No. 848,210
9 Claims. (Cl. 260—581)

This invention relates to a novel method for the preparation of amino substituted aromatic compounds and more particularly to a method of preparing amino substituted aromatic compounds by the direct conversion of a halo substituted aromatic compound.

The products which are obtained from the process of the present invention will find a wide variety of uses in the chemical field. For example, in a specific example of the present process, p-dichlorobenzene may be converted to aniline, which is valuable as a dye intermediate, as an antiknock agent for gasoline and for conversion to compounds useful as antioxidants and aniozonants.

It is therefore an object of this invention to provide a method for preparing aromatic compounds containing substituents which are useful as intermediates in the preparation of other organic chemicals.

A further object of this invention is to provide a method whereby a halo substituted aromatic compound containing at least two halogen atoms on the ring may be converted to an aromatic compound containing an amino radical and having at least one substituent less on the ring than said halo substituted aromatic compound.

One embodiment of this invention is found in a process for the preparation of an amino substituted aromatic compound which comprises directly ammonolyzing a halo substituted aromatic compound containing at least two halogen atoms on the ring with an ammonia solution at an elevated temperature to form the desired products containing an amino radical and having at least one substituent less on the ring that said halo substituted aromatic compound.

A further embodiment of this invention is found in a process for the preparation of an amino substituted aromatic compound which comprises directly ammonolyzing a halo substituted aromatic compound containing at least two halogen atoms on the ring with an aqueous ammonia solution and an ammonium salt at a temperature in the range of from about 50° to about 350° C. to form the desired product containing an amino radical and having at least one substituent less on the ring than said halo substituted aromatic compound.

Yet another embodiment of the invention is found in a process for the preparation of an amino substituted aromatic compound which comprises directly ammonolyzing a halo substituted aromatic compound containing at least two halogen atoms on the ring with an aqueous ammonia solution and ammonium acetate at a temperature in the range of from about 50° to about 350° C. to form the desired product containing an amino radical and having at least one substituent less on the ring than said halo substituted aromatic compound.

A specific embodiment of the invention resides in a process for the preparation of an amino substituted aromatic compound which comprises directly ammonolyzing p-dichlorobenzene with an aqueous ammonia solution and ammonium acetate at a temperature in the range of from about 300° to about 350° C. to form aniline.

Other objects an dembodiments referring to alternative halo substituted aromatic compounds and to alternative ammonium salts will be found in the following further detailed description of the invention.

As hereinbefore set forth it has now been found possible to directly ammonolyze an aromatic compound containing at least two halogen atoms on the ring by treating said compound with an aqueous ammonia solution or an aqueous ammonia solution containing an ammonium salt in solution to obtain an amino substituted aromatic compound containing at least one substituent less than the original halogenated aromatic compound and which may comprise either a nuclearly substituted amino aromatic compound containing only carbon, hydrogen and nitrogen atoms or a nuclearly substituted amino aromatic compound which may also contain one or more halogen substituents on the ring, said compounds containing only carbon, hydrogen, nitrogen and halogen substituents. The halogen substituents which are preferred are those having an atomic weight between 35 and 127 (i.e. chlorine, bromine, and iodine) and include monocyclic halogenated aromatic compounds such as o-, m-, and p-dichlorobenzene, o-, m- and p-dichromobenzene, o-, m- and p-diiodobenzene, 2,4-dichlorotoluene, 2,4-dibromotoluene, 2,4-diiodotoluene, isomers of these dihalotoluenes, analogous dihaloethylbenzenes, -propylbenzenes, isopropylbenzenes, and higher alkylbenzenes, dihaloxylenes, dihalodialkylbenzenes, 1,2,3-trichlorobenzene, 1,2,3-tribromobenzene, 1,2,3-triiodobenzene, 1,2,4-trichlorobenzene, 1,2,4-tribromobenzene, 1,2,4-triiodobenzene, 1,2,5-trichlorobenzene, 1,2,5-tribromobenzene, 1,2,5-triiodobenzene, 1,3,5-trichlorobenzene, 1,3,5-tribromobenzene, 1,3,5-triiodobenzene, etc., tetrahalobenzenes, pentahalobenzenes, hexahalobenzenes; polycyclichalogenated aromatic compounds such as 1,4-dichloronaphthalene, 1,4-dibromonaphthalene, 1,4-diiodonaphthalene, 1,6-dichloronaphthalene, 1,6-dibromonaphthalene, 1,6-diiodonaphthalene, 1,8-dichloronaphthalene, 1,8-dibromonaphthalene, 1,8-diiodonaphthalene, 2,6-dichloronaphthalene, 2,6-dibromonaphthalene, 2,6-diiodonaphthalene, 2,7-dichloronaphthalene, 2,7-dibromonaphthalene, 2,7-diiodonaphthalene, etc., the dihalogenated and polyhalogenated anthracenes, chrysenes, pyrenes, phenanthrenes, naphthacenes, etc. It is to be understood that the aforementioned halogenated aromatic compounds are only representatives of the class of compounds which may be used and that the present invention is not necessarily limited thereto.

The conversion of the aforementioned halo substituted aromatic compounds is effected by treating the compounds in the presence of an aqueous ammonia solution or an aqueous solution of ammonia and a salt of a weak acid such as ammonium formate, ammonium acetate, ammonium propionate, ammonium carbonate, ammonium borate, etc. The reaction is effected at elevated temperatures and pressures, the temperatures being in the range of from about 50° to about 350° C. or higher. The preferred temperature at which the reaction proceeds is in the range of from about 275° to about 325° C. The pressure may be atmospheric or superatmospheric up to 250 atmospheres or more.

The process of the present invention may be effected in any suitable manner and may comprise either a batch or a continuous type operation. For example, when a batch type operation is used a quantity of the starting materials comprising the aromatic compound containing at least two halogen substituents on the ring is placed in an appropriate apparatus such as a rotating autoclave along with the aqueous ammonia solution, or the aqueous solution of ammonia and an ammonium salt such as ammonimum acetate. The apparatus is sealed, brought to a superatmospheric pressure with an inert gas such as nitrogen, if desired, and heated to the reaction temperature. Upon completion of the desired residence time the apparatus and contents thereof are allowed to cool to room temperature, the pressure is vented and the amino substituted aromatic compound is extracted with an organic solvent such as pentane, benzene, toluene, etc., which is immiscible with the aqueous ammonia solution, separated from the aqueous ammonia solution and recovered by conventional means such as fractional distillation, crystallization, etc.

A preferred method for effecting the reaction of the present invention is a continuous type operation. When this type of operation is used, the halo substituted aromatic compound is continuously charged to a reaction zone which is maintained at the proper operating conditions of temperature and pressure. The reaction zone may comprise an unpacked vessel or coil or may be lined with an adsorbent packing material such as fire brick, alumina, dehydrated bauxite and the like. The aqueous ammonia solution or the aqueous solution of ammonia and the ammonium salt of a weak acid are also continuously charged to the reaction zone. If so desired, an aqueous solution of the ammonium salt and the aqueous ammonia solution may be continuously charged to the reaction zone through separate lines. Yet another alternative is to mix all three of the compounds together before entry into said zone and charge all three together in a single stream. Upon completion of the desired residence time the amino substituted aromatic compound is continuously withdrawn from the reaction zone, separated from the reactor effluent, purified and recovered by conventional means while the residual effluent may be recycled to form a portion of the feed stock. Inasmuch as the unreacted halo substituted aromatic compound may be recovered in a substantially quantitative amount, and subsequently recycled for further conversion, the reaction is economically attractive as a commercial method for obtaining the desired products.

The following examples are given to illustrate the process of the present invention, which, however, are not intended to limit the generally broad scope of the present invention in strict accordance therewith.

*Example I*

Twenty-nine grams of p-dichlorobenzene along with 227 cc. of ammonium hydroxide (30% by weight of ammonia) were placed in the glass liner of a rotating autoclave having a capacity of 850 cc. The liner was sealed into the autoclave and nitrogen pressed in until an initial pressure of 30 atmospheres had been reached. The autoclave was then slowly heated for about two hours at a temperature of about 300° C. and maintained thereat for a period of about 10 hours during which time the maximum pressure in the autoclave reached 245 atmospheres. At the end of this time the autoclave and contents thereof were allowed to cool to room temperature, the final pressure at room temperature being 36 atmospheres. The excess pressure was vented and the product comprising 171 g. inside the liner and 30 g. outside the liner were recovered and combined. The organic products were extracted with pentane, the aqueous ammonia was separated and the penetane extract was subjected to fractional distillation, the cuts boiling at 184–185° C. and 230–231° C. comprising aniline and p-chloroaniline respectively were separated and recovered therefrom.

*Example II*

Twenty-nine grams of p-dichlorobenzene along with 225 g. of ammonium hydroxide (30% by weight of ammonia) along with 31 g. of ammonium acetate were placed in the glass liner of a rotating autoclave similar to that used in Example I above. The liner was sealed into the autoclave and nitrogen pressed in until an initial pressure of 30 atmospheres had been reached. As in Example I, the autoclave was then slowly heated to a temperature of 300° C. and maintained at that temperature for a period of 10 hours, the maximum pressure during this residence time being 235 atmospheres. At the end of this time the autoclave and contents thereof were allowed to cool to room temperature, the final pressure at room temperature being 39 atmospheres. The excess pressure was vented and the reaction product comprising 223 g. inside the liner and 48 g. outside the liner were recovered and combined. The product was extracted with pentane, the aqueous ammonia and ammonium acetate were separated from the extract, the latter then being subjected to fractional distillation. The cuts boiling at 184–185° C., comprising aniline, and 230–231° C. comprising p-chloroaniline, were separated and recovered therefrom.

*Example III*

Forty-seven grams of p-dibromobenzene along with 225 g. of ammonium hydroxide (30% by weight of ammonia) and 31 g. of ammonium acetate are placed in a rotating autoclave similar to that used in the above examples. The liner is sealed into the autoclave and nitrogen is pressed in until an initial pressure of approximately 30 atmospheres is reached. The autoclave is then heated between a temperature of 275° and 325° C. for a period of about 10 hours, the maximum pressure during this time being over 200 atmospheres. At the end of this time the autoclave and contents thereof were cooled to room temperature, the excess pressure is vented and the reaction products both inside the liner and outside the liner are combined and extracted with pentane. The aqueous ammonia and ammonium acetate are separated from the pentane extract, the latter then being subjected to fractional distillation under reduced pressure. The cuts comprising aniline and p-bromoaniline are separated and recovered therefrom.

*Example IV*

A mixture of 39 g. of 1,4-dichloronaphthalene, 225 g. of ammonium hydroxide and 31 g. of ammonium acetate are placed in an autoclave and subjected to the same conditions as hereinbefore set forth in the preceding examples, that is, an initial pressure of 30 atmospheres of nitrogen, heating the autoclave to a temperature of approximately 300° C. and maintaining the autoclave thereat for a residence time of approximately 10 hours. At the end of this time the autoclave and contents thereof are allowed to cool to room temperature, the excess pressure is vented and the reaction products, both inside and outside the liner are combined. The reaction product is extracted with pentane, the ammonium solution and ammonium acetate are separated therefrom and the extract is subjected to fractional distillation under reduced pressure, the 1-naphthylamine (melting at about 50° C.) being separated therefrom.

*Example V*

In this example a mixture of 32 g. (0.2 mole) of 2,4-dichlorotoluene, 225 g. of ammonium hydroxide and 30 g. of ammonium acetate are treated in a manner similar to that set forth in the above examples. At the end of the desired residence time the autoclave and contents thereof are allowed to cool to room temperature, the excess pressure is vented and the reaction product after being combined, extracted with pentane and separated from the ammonium solution and ammonium acetate is subjected to fractional distillation under reduced pressure. The cut comprising o- and p-toluidine and 2-chloro-p-toluidine being separated and recovered therefrom.

We claim as our invention:

1. A process for the preparation of an amino substituted aromatic compound which comprises directly ammonolyzing a nuclearly halogenated aromatic hydrocarbon containing at least two halogen atoms on the ring and consisting of carbon, hydrogen and halogen with an aqueous solution of ammonia and an ammonium salt at a temperature in the range of from about 50° to about 350° C. to form an aromatic compound containing an amino radical on the ring and having at least one halogen substituent less on the ring than said halogenated aromatic hydrocarbon.

2. A process for the preparation of an amino substituted aromatic compound which comprises directly ammonolyzing a nuclearly halogenated aromatic hydrocarbon containing at least two halogen atoms on the ring and consisting of carbon, hydrogen and halogen with an aqueous solution of ammonia and ammonium acetate at a temperature in the range of from about 50° to about 350° C. to form an aromatic compound containing an amino radical on the ring and having at least one halogen substituent less on the ring than said halogenated aromatic hydrocarbon.

3. A process for the preparation of an amino substituted aromatic compound which comprises directly ammonolyzing a nuclearly halogenated aromatic hydrocarbon containing at least two halogen atoms on the ring and consisting of carbon, hydrogen and halogen with an aqueous solution of ammonia and ammonium carbonate at a temperature in the range of from about 50° to about 350° C. to form an aromatic compound containing an amino radical on the ring and having at least one halogen substituent less on the ring than said halogenated aromatic hydrocarbon.

4. A process for the preparation of an amino substituted aromatic compound which comprises directly ammonolyzing a nuclearly halogenated aromatic hydrocarbon containing at least two halogen atoms on the ring and consisting of carbon, hydrogen and halogen with an aqueous solution of ammonia and ammonium borate at a temperature in the range of from about 50° to about 350° C. to form an aromatic compound containing an amino radical on the ring and having at least one halogen substituent less on the ring than said halogenated aromatic hydrocarbon.

5. A process for the preparation of an amino substituted aromatic compound which comprises directly ammonolyzing a nuclearly halogenated aromatic hydrocarbon containing at least two halogen atoms on the ring and consisting of carbon, hydrogen and halogen with an aqueous solution of ammonia and ammonium formate at a temperature in the range of from about 50° to about 350° C. to form an aromatic compound containing an amino radical on the ring and having at least one halogen substituent less on the ring than said halogenated aromatic hydrocarbon.

6. A process for the preparation of an amino substituted aromatic compound which comprises directly ammonolyzing p-dichlorobenzene with an aqueous solution of ammonia and ammonium acetate at a temperature in the range of from about 300° to about 350° C. to form aniline.

7. A process for the preparation of an amino substituted aromatic compound which comprises directly ammonolyzing p-dibromobenzene with an aqueous solution of ammonia and ammonium acetate at a temperature in the range of from about 300° to about 350° C. to form aniline.

8. A process for the preparation of an amino substituted aromatic compound which comprises directly ammonolyzing 1,4-dichloronaphthalene with an aqueous solution of ammonia and ammonium acetate at a temperature in the range of from about 300° to about 350° C. to form naphthylamine.

9. A process for the preparation of an amino substituted aromatic compound which comprises directly ammonolyzing 2,4-dichlorotoluene with an aqueous solution of ammonia and ammonium acetate at a temperature in the range of from about 300° to about 350° C. to form toluidines.

References Cited in the file of this patent

UNITED STATES PATENTS

| | | |
|---|---|---|
| 1,423,494 | Haas | July 18, 1922 |
| 1,882,811 | Grether et al. | Oct. 18, 1932 |
| 1,935,515 | Mills | Nov. 14, 1933 |

OTHER REFERENCES

Stevenson: Ind. and Eng. Chem., vol. 40, pages 1586–1587 (1948).

Roberts et al.: Jour. Am. Chem. Soc., vol. 78, pages 611–614 (1956).